UNITED STATES PATENT OFFICE.

INGOMAR F. ORTON, OF GALVESTON, TEXAS.

WEED-DESTROYING COMPOSITION.

1,020,049.  Specification of Letters Patent.  Patented Mar. 12, 1912.

No Drawing. Application filed July 8, 1910. Serial No. 571,033.

*To all whom it may concern:*

Be it known that I, INGOMAR F. ORTON, a citizen of the United States, residing at Galveston, in the county of Galveston and State of Texas, have invented new and useful Improvements in Weed-Destroying Compositions, of which the following is a specification.

This invention relates to a novel composition of matter for destroying Johnson grass and similar noxious weeds and grasses, the object of the invention being to provide a composition of this character which is effective in use, comparatively inexpensive of production, and non-poisonous to animal life.

My improved composition consists of a clear, permanent solution of sulfur, resulting from the combination of equal parts of sulfur, caustic soda and water. The caustic soda is first dissolved in the water and the saturated solution (NaOH) thus obtained added to the sulfur (S), the resultant chemical reaction producing a clear permanent solution of sulfur.

This composition is non-poisonous to human life and has been found highly destructive to Johnson grass and other similar noxious weeds and grasses. It may be applied by sprinkling the ground or grass with it, preferably after the grass is cut. It effectually kills the plant by destroying the root, thus preventing re-growth, and may be used with impunity, as it is non-poisonous to animal life.

Having thus described my invention, I claim:—

1. A grass and weed destroying compound resulting from the combination of substantially equal proportions of caustic soda, water and sulfur in the order named.

2. The herein-described process of producing a grass and weed destroying compound, which consists in first forming a saturated solution of caustic soda in water, and then adding sulfur equal in amount to the dissolved soda.

In testimony whereof I affix my signature in presence of two witnesses.

INGOMAR F. ORTON.

Witnesses:
 ROBERT INGAM,
 L. F. Fox.

Copies of this patent may be obtained for five cents each, by addressing the "Commissioner of Patents, Washington, D. C."